July 19, 1938.  J. S. McDONNELL, JR., ET AL  2,124,003
AIRCRAFT CONSTRUCTION
Filed Sept. 22, 1937  5 Sheets-Sheet 2
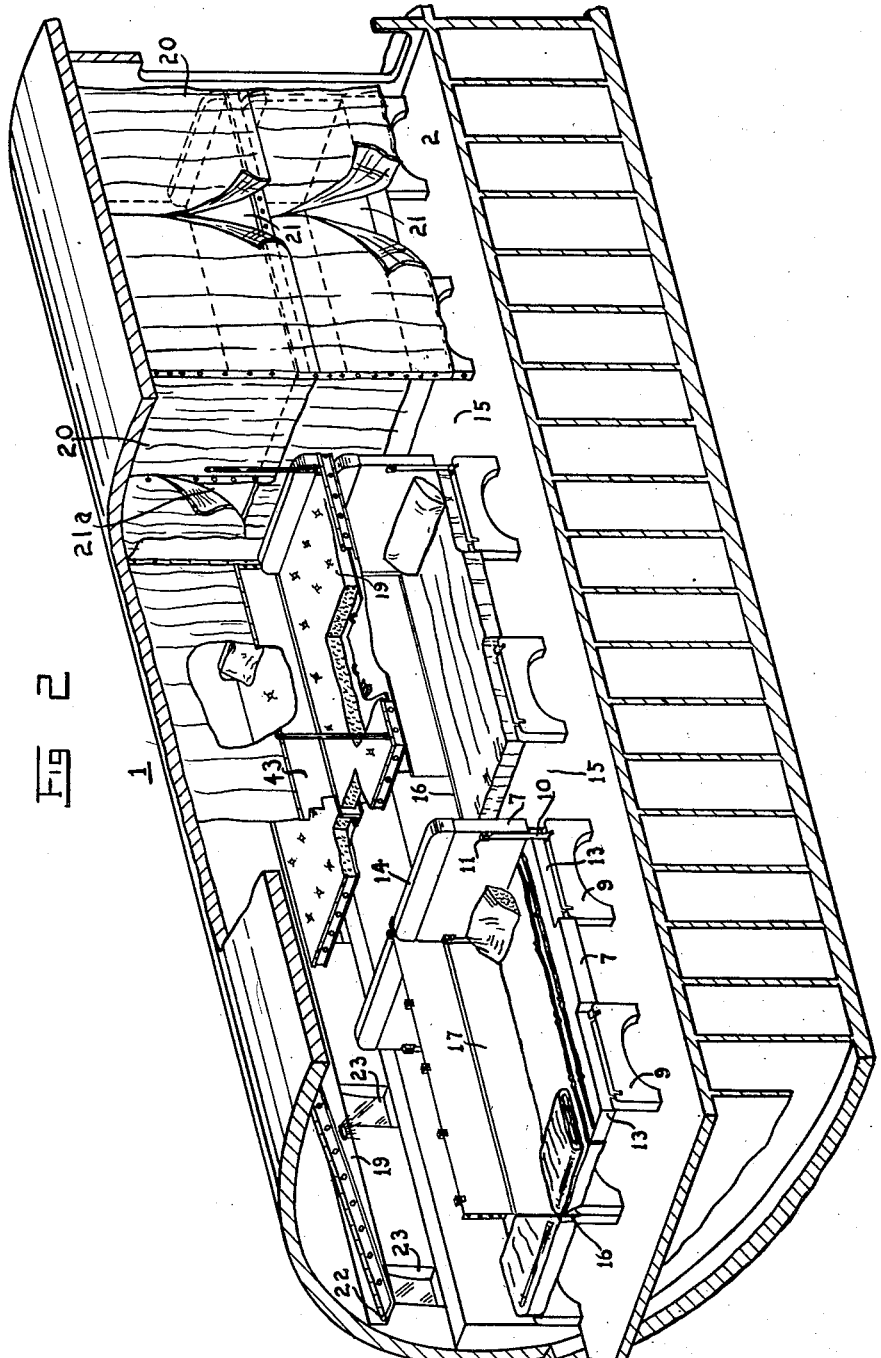
INVENTOR.
JAMES S. McDONNELL JR.
DREW M. HELWIG
BY
ATTORNEY.

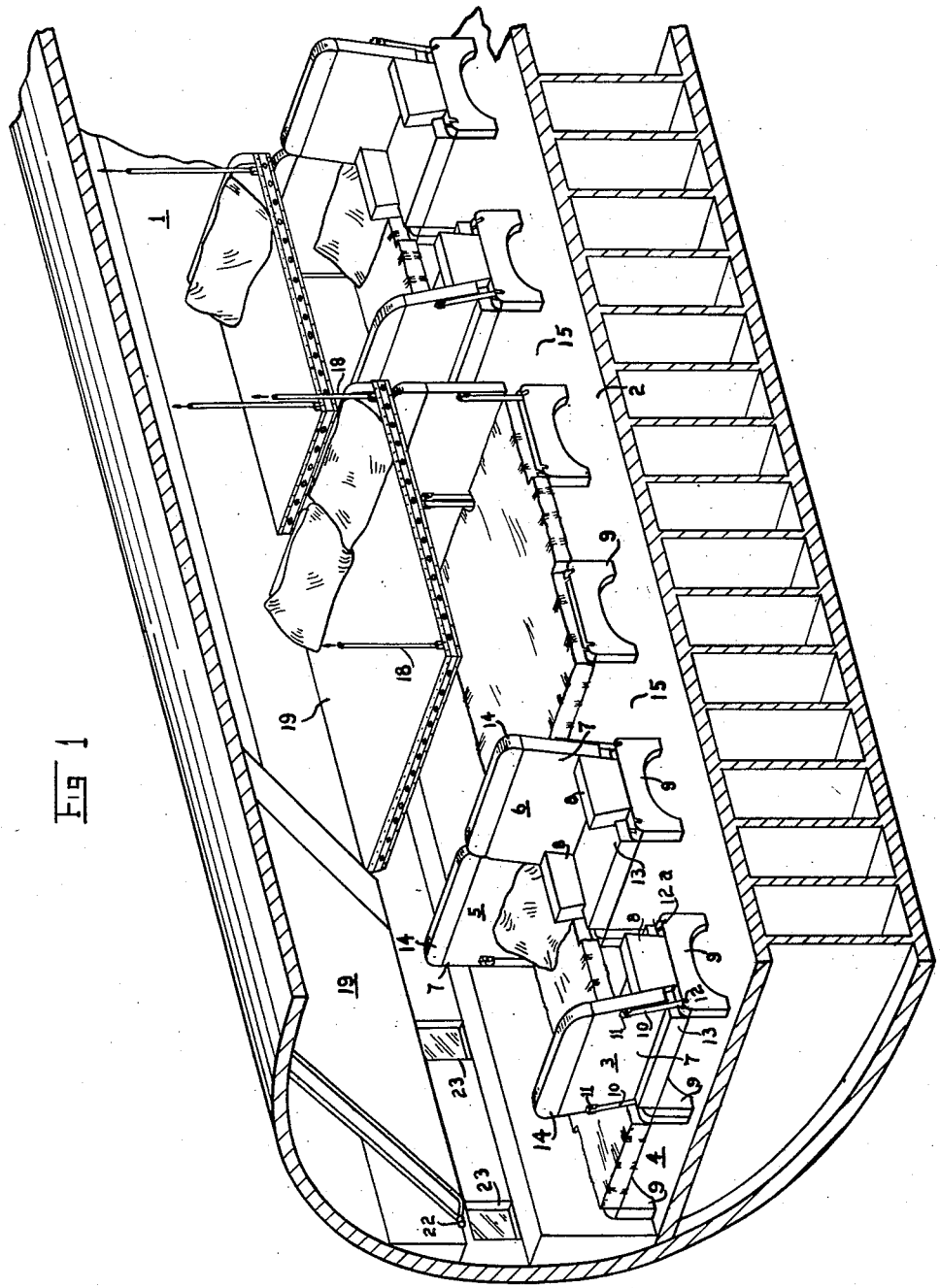

July 19, 1938.  J. S. McDONNELL, JR., ET AL  2,124,003
AIRCRAFT CONSTRUCTION
Filed Sept. 22, 1937  5 Sheets-Sheet 3
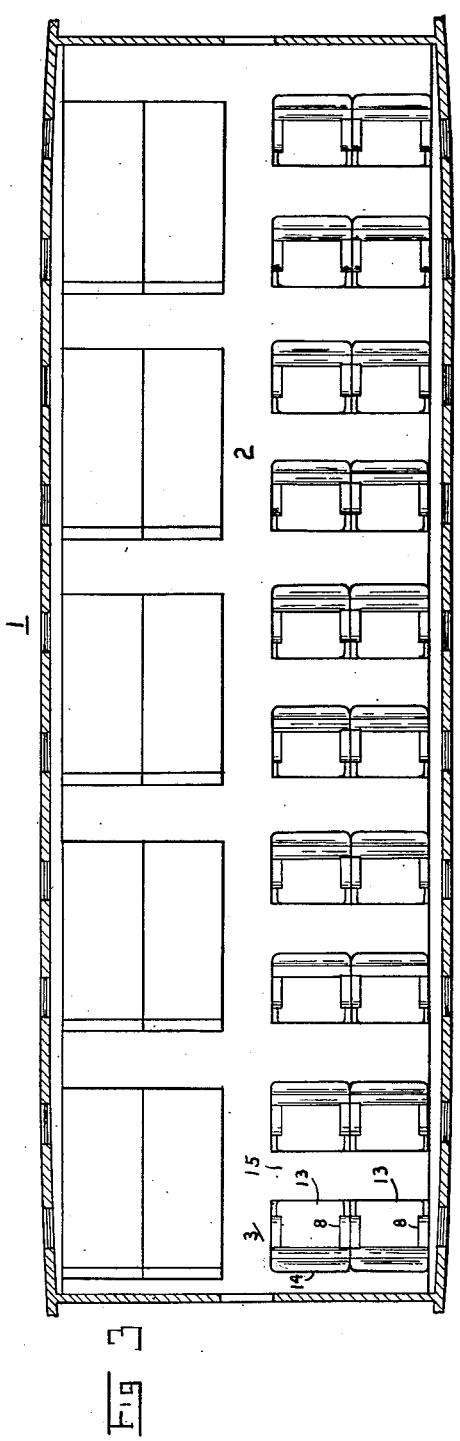
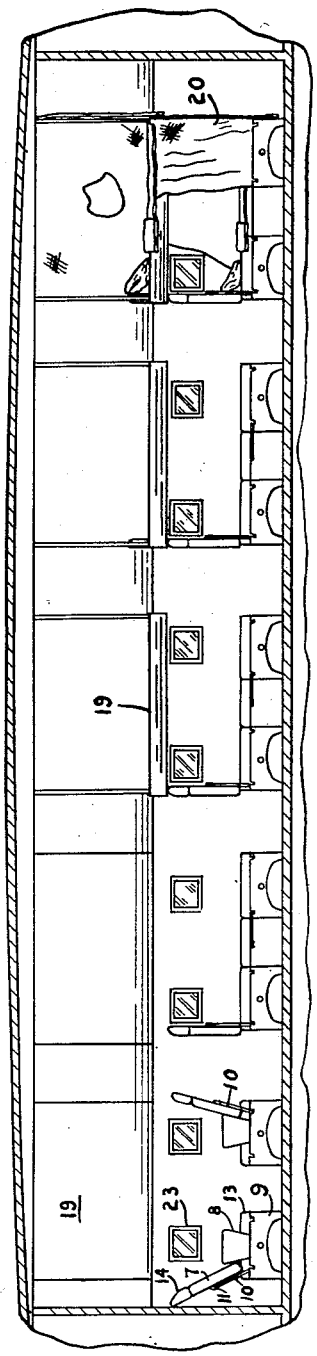
INVENTOR.
JAMES S. McDONNELL JR.
BY  DREW M. HELWIG
ATTORNEY.

July 19, 1938.  J. S. McDONNELL, JR., ET AL  2,124,003
AIRCRAFT CONSTRUCTION
Filed Sept. 22, 1937  5 Sheets-Sheet 4
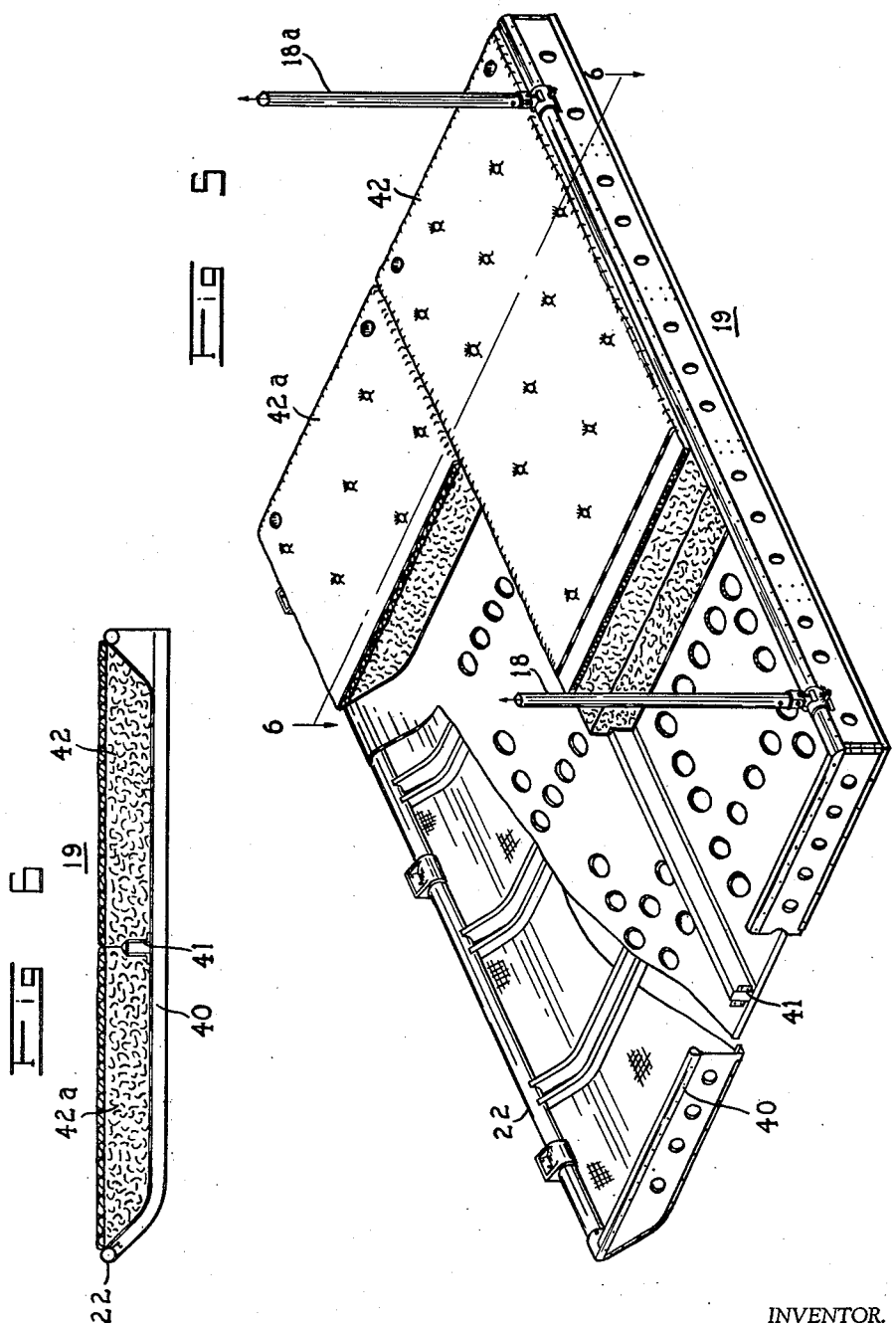
INVENTOR.
JAMES S. McDONNELL JR.
BY  DREW M. HELWIG
ATTORNEY.

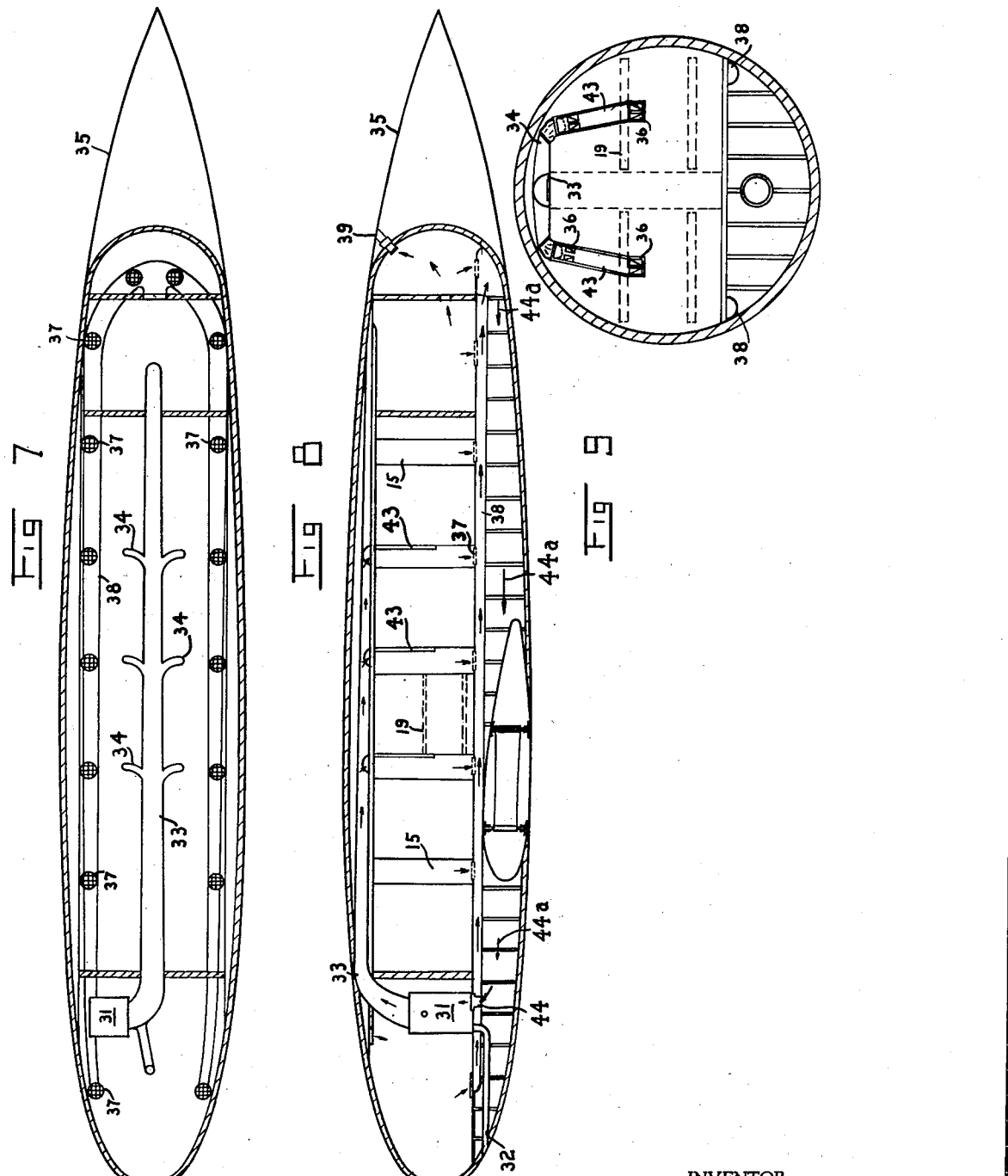

Patented July 19, 1938

2,124,003

UNITED STATES PATENT OFFICE 2,124,003

AIRCRAFT CONSTRUCTION

James S. McDonnell, Jr., Baltimore, and Drew M. Helwig, Raspeburg, Md., assignors to The Glenn L. Martin Company, Baltimore, Md.

Application September 22, 1937, Serial No. 165,026

9 Claims. (Cl. 244—118)

This invention relates to aircraft construction and more particularly to an aircraft fuselage or body possessing improved aerodynamic features together with a novel seating and berthing arrangement and attendant ventilating arrangement within the fuselage or body of the aircraft.

Because of the limited space provided for passengers within the fuselage of an aircraft and the important factor of saving weight, the sleeping berth arrangements in connection with seating capacity are of the greatest importance, Prior constructions do not provide the necessary sleeping facilities, having individual entrances, within the restricted space available for as many persons as the seating capacity allows.

The present invention overcomes the above described difficulties and in addition provides an adequate ventilating system in connection with the unique arrangement of the berthing facilities presented therein.

It is one object of this invention to provide a novel aircraft fuselage or body having improved aerodynamic features.

Another object is the attainment of a novel seating and berthing arrangement providing adequate room, a comfortable seat and an equally comfortable berth.

Another object is to provide a strong lightweight twin berthing and seating arrangement.

Another object is to provide twin lower berths which are made up largely from the seat cushions and backs of the four chairs comprising a section, and upper twin berths formed by letting-down a panel from the upper portion of the wall of the cabin.

Another object is the attainment of a berthing arrangement in which each of the berths is individually accessible from an aisle.

Another object is to provide twin lower and upper berths each having a dividing panel and curtains to insure privacy.

Another object is to provide an improved seating arrangement that shall be readily and easily convertible into berths for each occupant.

Another object is to provide ample and direct ventilation for the occupant of each berth individually.

The above and other objects will be made apparent throughout the further description of the invention when taken in connection with the accompanying drawings, wherein like reference characters refer to like parts. It will be understood that the drawings are not a definition of the invention but merely illustrate one particular form by means of which the invention may be effectuated. The invention will be defined by the appended claims.

In the drawings:

Figure 1 is a longitudinal sectional view of an aircraft cabin, showing in elevation the formative steps of converting seats into berths.

Figure 2 is the same view as in Figure 1 and shows another phase of the formative steps required for converting seats into berths.

Figure 3 is a horizontal sectional view, more or less diagrammatic, taken longitudinally, of the aircraft cabin in Figure 1, showing seating arrangement at one side of the aisle and berthing arrangement at the opposite side of the aisle.

Figure 4 is a vertical sectional view taken longitudinally of the cabin showing another phase of the transition of chair into berth.

Figure 5 is a perspective view of an upper wall panel with partly exposed inner structure.

Figure 6 is a detailed section on the line 6—6 of Figure 5 further illustrating the same structure.

Figure 7 is a horizontal sectional view taken longitudinally of an aircraft body showing the position of the ventilating duct, inlets, and vents.

Figure 8 is a vertical sectional view taken longitudinally of the aircraft body shown in Figure 7, showing ventilating system.

Figure 9 is a transverse sectional view taken through a seating and berthing section, showing the position of the ventilator inlets and outlets with relation to each berth.

Referring to the drawings, the present invention is illustrated in connection with an improved aircraft fuselage or body and for the purpose of description, the present aircraft body is termed as a body having a streamlined surface of revolution. In other words, the body is substantially circular in cross section throughout the greatest portion of its length. While the seating and berthing arrangement as well as the ventilating system is here disclosed in connection with an airplane body having a streamlined surface of revolution, it is to be distinctly understood that the present arrangement of the seating and berthing sections as well as the ventilating system is not limited to bodies of this particular type. However, the present seating and berthing arrangement as well as the ventilating system is particularly adapted to this type of body, the latter having been found to be possessed of desirable aerodynamic characteristics.

Figures 1 to 5, inclusive, illustrate one embodiment of the invention in which I indicates a portion of the passenger cabin of an aircraft body having a central aisle 2 running longitudinally of said cabin. A plurality of portholes 23 are positioned on each side wall of the cabin. On each side of aisle 2 a plurality of seats of exceedingly light construction are arranged in units of two, mounted side by side on the floor of cabin 1, and a short aisle 15 runs transversely of the cabin and separates each section from the adjacent section. Two units of four seats form a section, all of the seats normally facing in the direction of flight. The seats of each section are indicated by the numerals 3, 4, 5, and 6, but each seat is or may be identical with the other. For simplification, the structure of only one section is described herein, but it is understood that this description applies equally to all of the other sections.

Representative of all of the seats in each section, seat 3 comprises an adjustable back 7, a removable pair of arm rests 8 and a cushion 13, the latter supported by spaced leg panels 9 positioned under each side of the said seat cushion and rigidly mounted to the floor of cabin 1. Back 7 possesses a short upper section 14, removably attached to said back, the said upper section being in coplanar relationship with the said back. Back 7 is pivotally supported upon the upper ends of arms 10 as indicated at 11, each of said arms extending upwardly and parallel to each side of back 7. The lower end of each arm rests in a pocket 12 inserted in the top of each respective leg panel. As will be noted, the seats may be individually reversed by lifting back 7 together with arms 10 from pockets 12, reversing said back and inserting said arms into pockets 12a situated in the upper portion of each leg panel 9 and at opposite ends from pocket 12, so that said seat may face either forwardly or rearwardly.

In setting up the berths, however, it is assumed that seats 3 and 4 face seats 5 and 6. The first step is to remove arm rests 8 of all of the four seats. This is done by lifting rest 8 from the groove of leg panel 9 in which it rests, said arm rest then being placed under seat 3 on the floor and out of the way. Next, upper portion 14 of back 7 of seats 3 and 4 is similarly removed and employed as a head or foot end of the corresponding upper berth. Back 7 together with arms 10 is then lifted from slots 12, the ensemble moved to the front of said seats, arms 10 are inserted in slots 12a, the back 7 is pivoted upward and rearward of said arms and the whole, back and arms, pivoted in slots 12a forwardly and downwardly until back 7 lies in coplanar relationship to seat cushion 13 of seats 3 and 6, respectively, the edge of back 7 abutting the forward edge of seat cushion 13 of seat 6, the whole being supported and held in position by arms 10. In this manner seat cushion 13 and back 7 of seat 3 form a single lower berth with seat cushion 13 of seat 6. The same operation as described above and applied to seats 4 and 5 results in a similar lower berth, the two berths abutting each other and forming a twin lower berth. A longitudinally running track 16 is formed in the center of the twin berth to receive a partition 17, said partition dividing the lower berth section. When not in use, partition 17 may be stored in a panel 19 further described below. Back 7 of chairs 5 and 6 is then raised to a vertical position and constitutes the head panel of said berths.

The twin upper berths are formed by letting down panel 19 from the upper portion of the wall of cabin 1, the said panel being hingedly connected to the said wall as shown at point 22, above portholes 23.

Panel 19, shown in detailed construction in Figures 5 and 6 of the drawings, consists of a frame structure 40 of exceptionally light construction, a pair of rods 18 and 18a hingedly connected to the forward edge of said panel and near the ends thereof in such manner that said rods can be folded inside said panel when not in use, and a grooved track 41 running longitudinally in the center of said panel dividing the latter into two equal sections. Each section has a mattress 42 and 42a of conventional structure to form twin upper berths.

Each free end of rods 18 and 18a is inserted, by means of a locking device of conventional structure, in a socket positioned in the ceiling of cabin 1, for the purpose of supporting the said panel. A partition 43 (see Figure 2), similar in construction to partition 17 dividing the lower berths, is then inserted in groove 41 to divide the upper berth section into twin berths. Curtains 20, which may likewise be stored in panel 19 when not in use, are provided to enclose the open ends and sides of the outside lower and upper berths. The said curtains abutting aisle 2 each have a vertical slit 21 approximately near the center of said curtains for the purpose of providing means of access to the respective berths from aisle 2. Curtains 20 at the foot of the inner lower and upper berths have a similar slit 21a, to provide access to said berths from short aisle 15.

Figures 7 to 9, inclusive, show the ventilating system within the fuselage 35 of the said aircraft, and which is used in connection with the above described seating and berthing arrangement. This ventilating system not only purifies the air within the cabin and berthing sections, but also maintains the atmospheric pressure at a constant level, regardless of the altitude of said aircraft. An air-conditioner 31 of conventional design is located forwardly of the passenger cabin and receives air by means of intake pipe 32, the latter having an intake opening in the nose of the aircraft. In this manner air enters said air-conditioner under forced draft created by the atmospheric pressure due to the forward movement of the said aircraft or a suction fan. A main pipe 33, circulating the conditioned air through the cabin and sleeping sections, extends upwardly from the top of the air-conditioner and is curved to run longitudinally through the upper section of said aircraft fuselage. At spaced intervals a plurality of branch pipes 34 extend laterally from each side of main pipe 33 to a point approximately over the center of each seating and berthing arrangement, the said branch pipes being downwardly curved at this point to protrude from the ceiling of the said aircraft passenger cabin. A short detachable tube 43 is suspended at this point from the curved end of each branch pipe 34, said tube bisecting the said curtained partition in such manner that vents 36 positioned one each at the top and bottom of the tube extend into each of the four berths making up a section, thus distributing pure air equally over a large area. Tube 43, as has been stated, is detachable and may be stored in the upper berth panel when the latter is not in use.

In the above described manner pure air is admitted under slight pressure to the various sleeping berths. For the purpose of removing the used air, an outlet pipe 38 is mounted under the floor of the cabin and provided with a plurality of vents 37 mounted in the floor of each section for receiving the used air. An outlet 39 protrudes rearwardly from the shell of the aircraft. Outlet 39 serves to eject part of the used air. The remainder of the used air is led back to air-conditioner 31 under the floor of the aircraft entering said air-conditioner at point 44. This used air is then mixed with the pure air coming from the intake pipe 32, reconditioned and distributed again as shown above.

Another important feature of the present construction is the desirable manner in which it lends itself for use in an aircraft body of that type known as a streamlined surface of revolution. In other words, a cross section through the greater portion of the length of such body is substantially circular (see Figure 9). The present invention contemplates the use of that portion of the body below the floor as a freight or baggage compartment. This portion of the body being employed for returning the used air from the pipe 38 to the air-conditioner 31, as indicated by the arrows 44a. This used air will operate to heat this baggage or freight compartment, while the latter serves to cool the heated used air.

Accordingly there is provided a novel seating and berthing arrangement for an aircraft or vehicle which provides a greater number of individual berths than any construction heretofore known to us. The present construction may be utilized to convert the same space employed for seating passengers into as many individual berths as there are seats. Also, there is here provided a separate and individual ventilating system for each of the several individual berths. The present arrangement provides a novel construction of aisles whereby each of the several individual berths has a private entrance.

While I have illustrated and described one embodiment of the invention, it will be apparent to those skilled in the art that the present invention may be equally applied to seating and berthing arrangements wherein similar conditions exist, and that it is expected that certain modifications, changes, alterations, substitutions, additions and omissions may be made in the construction here illustrated without departing from the spirit and scope of the appended claims.

We claim:

1. An aircraft cabin having a sleeping berth arrangement consisting of a plurality of sections forming an aisle, each of said sections comprising in combination two pairs of seats, means for transforming said seats into partitioned twin lower berths, means enclosing said twin lower berths, an upper panel hingedly connected to the wall of said aircraft cabin to form partitioned twin upper berths, a means enclosing said twin upper berths, and an individual entrance means from said aisle to each of the said berths.

2. An aircraft cabin having a sleeping berth arrangement consisting of a plurality of sections forming aisles, each of said sections comprising in combination two pairs of adjacent seats, means including a transposable seat back for transposing said seats into twin lower berths, an upper panel hingedly connected to the wall of the said cabin and adapted to form twin upper berths, a partition dividing each of said twin lower and upper berths to form individual berths, means for enclosing each of said individual berths, and an entrance means provided for each of the said individual berths.

3. An aircraft cabin in accordance with claim 2, wherein said cabin possesses a ventilating system having means including vents for passage of air into each individual berth, means of escape for said air, when used, from the said berth, and means of reconditioning said used air for renewed use.

4. In an aircraft cabin having a plurality of sections forming aisles, each of such sections comprising two pairs of adjacent seats, means for transposing said seats into twin lower berths, an upper panel hingedly mounted on the wall of said cabin to form twin upper berths, a partition in each of said twin lower and twin upper berths to form individual berths, means to enclose each of said individual berths, separate entrance means for each of said berths, and a ventilating system having means for individually ventilating each of said berths.

5. An aircraft sleeping berth arrangement comprising in combination two pairs of adjacent seats including means for transforming said seats into twin lower berths, an upper panel to form twin upper berths, enclosing means for each of said berths to form private single berths, and an individual outer entrance to each of said private single berths.

6. An aircraft cabin including a seating and sleeping section, the said section including accommodations for seating at least two passengers in side by side relation on one side of an aisle passageway and means for converting the said section into individual lower sleeping berths disposed in side by side relation for accommodating an equal number of the said passengers, and individual upper berths equal to the number of lower berths, and a private entrance from said aisle passageway to each of said berths.

7. An aircraft cabin including a seating and sleeping section, the said section comprising at least four seats disposed on one side of an aisle passageway and means including upper berths for converting the said section into four individual sleeping berths each of the said berths being provided with a private entrance.

8. An aircraft cabin including a seating and sleeping section, the said section comprising at least four seats disposed on one side of an aisle passageway, means including upper berths for converting the said section into four individual sleeping berths, and means for private access to each of the said berths, the said means including passageways on aisles disposed at substantially right angles one to the other.

9. In an aircraft, two seating means each adapted to seat two persons and covering a predetermined floor space, means within said floor space to convert said seating means into a pair of lower berths and to form a pair of upper berths, partitions for separating the berths of each pair, an aisle in the central portion of said aircraft, said seats being arranged on one side of said aisle, and an individual entrance means from said aisle to each of said berths.

JAMES S. McDONNELL, JR.
DREW M. HELWIG.